United States Patent [19]

Clemens

[11] 3,816,355

[45] June 11, 1974

[54] MACRORETICULAR SULFONATED PYRIDINE-DIVINYLBENZENE RESINS

[75] Inventor: David H. Clemens, Willow Grove, Pa.

[73] Assignee: Rohm and Haas Company, Philadelphia, Pa.

[22] Filed: Dec. 6, 1971

[21] Appl. No.: 205,364

[52] U.S. Cl............. 260/2.1 E, 260/2.1 R, 423/244
[51] Int. Cl. ........................................ C08f 19/20
[58] Field of Search........................ 260/2.2 R, 2.1

[56] References Cited
FOREIGN PATENTS OR APPLICATIONS
302,492   1/1965   Spain
932,125   7/1963   Great Britain

OTHER PUBLICATIONS

Seidl et al., Adv. Polzm. Sci. 5, 124–129 (1967).

Shiota et al., Mem. Fac. Eng., Kyoto Univ. 31(Pt. 2), 274–283 (1969).

Smirnov et al., Vysokomol. Soedin., Ser. A, 10, 1,937–1,945 (1968).

Smirnov et al., Vysokomol. Soedin., Ser. B, 9, 657–661 (1967).

*Primary Examiner*—Melvin Goldstein

[57] ABSTRACT

Macroreticular sulfonated, vinyl nitrogen heterocyclic resins are effective adsorbents for $SO_2$ and/or $SO_3$ and also have ion-exchange properties. The resins are thus useful in preventing or controlling pollution since they can be used to remove the sulfur oxide contaminants from exit or stack gases from sulfuric acid manufacturing plants, power plants which burn fossil fuels, etc.

3 Claims, No Drawings

MACRORETICULAR SULFONATED PYRIDINE-DIVINYLBENZENE RESINS

This invention relates to macroreticular porous resins which are sulfonated polymers of a vinyl nitrogen heterocyclic monomer. More particularly, the macroreticular resins of the present invention are sulfonated, crosslinked polymers of a vinyl nitrogen heterocyclic monomer, such as a vinyl pyridine, crosslinked with a polyvinyl aromatic hydrocarbon compound, preferably a divinyl aromatic compound such as divinylbenzene or a trivinyl aromatic compound such as trivinylbenzene. Such a resin, as more fully described below, is produced and used in a finely divided or bead form which contains a high degree of fixed polymeric porosity. The porous nature and surface area, i.e., the macroreticularity, provides for a more effective adsorption and desorption of acidic gases such as sulfur dioxide or sulfur trioxide and also provides for a very high and a much greater flow rate than has heretofore been possible, for example by using the gel resins of the prior art. The specific nature of the copolymer which comprises the backbone of the resin is relatively unimportant, but it is essential that the backbone of the resin contain at least about 15 percent by weight of a vinyl nitrogen heterocyclic monomer. However, in general, the backbone of these resins will be the crosslinked copolymer of (1) a poly-unsaturated monomer containing a plurality of non-conjugated

0010/003/NCD groups, which acts as a crosslinking agent and (2) a vinyl nitrogen heterocyclic monomer or a mixture of a vinyl nitrogen heterocyclic monomer and another copolymerizable monovinylidene or ethylenically unsaturated comonomer.

Suitable polyvinyl aromatic crosslinking agents include, for example, divinylbenzene, divinyltoluenes, divinylnaphthalenes, divinylxylene, divinylethylbenzene, trivinylbenzene, trivinylnaphthalene and polyvinylanthracenes.

Preferred polyvinyl aromatic, hydrocarbon crosslinking monomers are the divinylaromatic compounds exemplified by divinylbenzene and the trivinylaromatic compounds exemplified by trivinylbenzene.

Preferably, the novel, sulfonated, macroreticular crosslinked vinyl nitrogen heterocyclic resins are sulfonated macroreticular crosslinked copolymers of (a) about 20 to about 60 parts by weight (20 to 60 percent) of the polyvinyl aromatic hydrocarbon monomer or compound (crosslinker) and (b) about 80 to about 40 parts by weight (80 to 40 percent) of the vinyl nitrogen heterocyclic monomer or compound. Up to about one-half, but preferably no more than about one-fourth of the vinyl nitrogen heterocyclic monomer may be replaced with a copolymerizable monovinylidene or ethylenically unsaturated comonomer, as hereinafter set forth, provided however that the copolymer contain at least about 15 parts or 15 percent by weight of the vinyl nitrogen heterocyclic monomer. (The amounts or percentages given above are based on the copolymer, i.e., prior to sulfonation which is done by post reaction to introduce sulfonic groups.) More preferably, (a) is present in about 30 to about 50 parts by weight and (b) is present in about 70 to 50 parts by weight.

Suitable monoethylenically unsaturated comonomers include esters of acrylic acid, such as methyl acrylate, ethyl acrylate, propyl acrylate, isopropyl acrylate, butyl acrylate, tert-butyl acrylate, ethylhexyl acrylate, cyclohexyl acrylate, isobornyl acrylate, benzyl acrylate, phenyl acrylate, alkylphenyl acrylate, ethoxymethyl acrylate, ethoxyethyl acrylate, ethoxypropyl acrylate, propoxymethyl acrylate, propoxyethyl acrylate, propoxypropyl acrylate, ethoxyphenyl acrylate, ethoxybenzyl acrylate, ethoxycyclohexyl acrylate, the corresponding esters of methacrylic acid, styrene, o-, m- and p- methyl styrenese, and o-, m-, and p-ethyl styrenes, vinyl naphthalene, vinyltoluene, vinylnaphthalene and ethylvinylbenzene.

The vinyl nitrogen heterocyclic monomer is preferably a monovinylidene ring-containing nitrogen heterocyclic compound (monomer) or nitrogen and oxygen containing heterocyclic compound or monomer, such as vinylpyridine, e.g., 2-vinylpyridine or 4-vinylpyridine, or an alkyl substituted vinylpyridine such as 2-methyl-5-vinylpyridine, 2-ethyl-5-vinylpyridine, 3-methyl-5-vinylpyridine, 2,3-dimethyl-5-vinylpyridine, and 2-methyl-3-ethyl-5-vinylpyridine, vinylquinoline, 2-methyl-5-vinyl-quinoline, 4-methyl-4-vinyl-quinoline, 1-methyl-or 3-methyl-5-vinylisoquinoline and vinylpyrimidine, vinylpyrazine, vinyl-s-triazine, vinylpyrano(3,4-b)-pyrrole, vinylindoxazine, vinylbenzoxazole, vinylquinazoline, vinylnaphthyridine, vinylpyrido(3,2-b)-pyridine, vinylpyrido(4,3-bi)-pyridine and vinylacridine.

The polymerization reaction for preparation of the adsorbent resins of the present invention is generally carried out in the presence of a catalyst. Suitable catalysts which provide free radicals to function as reaction initiators include benzoyl peroxide, t-butyl hydroperoxide, cumene hydroperoxide, tetralin peroxide, acetyl peroxide, caproyl peroxide, t-butyl perbenzoate, t-butyl diperphthalate, methyl ethyl ketone peroxide.

The amount of peroxide catalyst required is roughly proportional to the concentration of the mixture of monomers. The usual rang is 0.01 to 5 percent of catalyst with reference to the weight of the monomer mixture. The optimum amount of catalyst is determined in large part by the nature of the particular monomers selected, including the nature of the impurities which may accompany the monomers.

Another suitable class of free radical generating compounds which can be used as catalysts are the azo catalysts, including for example, azodiisobutyronitrile, azodiisobutyramide, azobis($\alpha,\alpha$-dimethylvaleronitrile), azobis($\alpha$-methyl-butyronitrile), dimethyl, diethyl, or dibutyl azobis(methyl-valerate). These and other similar azo compounds, which serve as free radical initiators, contain an $-N=N-$ group attached to aliphatic carbon atoms, at least one of which is tertiary. An amount of 0.01 to 2 percent of the weight of monomer or monomers is usually sufficient.

In preparing the macroreticular adsorbent resins, the polymerization reaction is preferably carried out in the presence of a precipitant (or phase extender) which is a liquid (a) which acts as a solvent for the monomer mixture and is chemically inert under the polymerization conditions and (b) which is present in such amount and which exerts so little solvating action on the product crosslinked copolymer that phase separation of the product copolymer takes place as evidenced by the fact that the product copolymer is no more than semi-transparent and is preferably opaque when associated with a fluid having a different refractive index. However, phase extenders which exert some solvating or swelling action may also be used.

The determination of the most effective precipitant and the amounts required for the formation of a particular copolymer may vary from case to case because of the numerous factors involved. However, although there is no "universal" or single clase of precipitants or phase extenders applicable to al cases, it is not too difficult to determine which precipitants will be effective in a given situation. The requirements of solubility with the monomer mixture and low solvating action on the product copolymer can be tested empirically and the solubilities of many monomers and copolymers are well known from publications and textbooks.

As a further guide in the selection of a suitable precipitant, reference may be made to scientific literature, for instance, as discussed in Hildebrand and Scott, Solubility of Non-Electrolyes, 3d. ed., New York, 1950. In general, it may be stated that sufficiently wide differences in the solubility parameters of copolymer and solvent, respectively, must exist for the precipitant to be effective and that, once an effective precipitant has been located, the behaviour or many other liquids can be predicted from the relative position of the reference polymer and precipitant in published tables, within the accuracy of such published information. Furthermore, if the solubility parameter of a given polymer occupies an intermediate position in these tables, solvents with both higher or lower parameters may become effective.

A minimum concentration of any particular precipitant is required to effect phase separation. This is comparable to the observation that many liquid systems containing two or more components are homogenous when some components are present in only minor amounts; but, if the critical concentration is exceeded, separation into more than one liquid phase will occur. The minimum concentration of the precipitant in the polymerizing mixture will have to be in excess of the critical concentration. The amounts in excess of such critical concentration can be varied and they will influence to some extent the properties of the product so formed.

Too high a concentration of the precipitant may be undesirable for practical reasons since the rate of copolymerization may decrease and the space-time yields become low. In many cases, the amount of precipitant employed may be between 25 percent and 60 percent of the total weight of the monomer mixture and the precipitant.

The amount of precipitant liquid required to effect phase separation varies inversely with the degree of crosslinking of the copolymer so that the greater the crosslinker content the lesser is the amount of precipitant employed.

As stated above, the chemical character of the precipitant may vary appreciably, depending on the monomer mixture which is used. When employing vinyl heterocyclic monomers and aromatic hydrocarbon type monomers, such as, for instance, a vinylpyridine and divinylbenzene, alkanols and/or ketones preferably with a carbon atom content of from four to 10 will, if sufficient crosslinker is used, effect the desired phase separation when used in amount of from 30 to 50 percent of the total weight of monomers and precipitant. Saturated aliphatic hydrocarbons containing at least seven carbon atoms, such as heptane and isooctane, may also be employed as precipitants or phase extenders, usually, in amounts of from 30 to 50 percent of the total weight of the monomers and precipitant.

Many polymerization methods can be used in preparing these macroreticular resins. The preferred method, however, is suspension polymerization. In this case, an additional factor must be considered, namely, the solubility, i.e., miscibility, of the precipitant in the suspending medium. Since suspension polymerization of most ethylenically unsaturated monomers is generally conducted in aqueous media, most frequently it is the water-solubility of the precipitant which must be considered. While precipitants with water-solubilities as high as 20 grams per 100 grams of water can be employed, a low water-solubility is preferred because of handling ease, ease of recovery, and processing economics. As is well known, however, it is possible to decrease the water-solubilities of compounds by adding salts to the aqueous phase and this method also may be employed to decrease the water-solubilities of a precipitant liquid. The general position is that, when suspension polymerization is used, the precipitant should be either immiscible or only partially miscible with the suspending medium.

Polymerization temperature can vary widely, but generally it will be in the range of about 20° C. to about 100° C., or higher.

Other suitable methods for preparation of the macroreticular resins are disclosed in U.S. Pat. Nos. 3,275,548 and 3,357,158 as well as in British Pat. Nos. 932,125 and 932,126.

The sulfonated macroreticular, vinyl nitrogen heterocyclic resins of the present invention should have a porosity of at least about 10 percent, and more preferably at least 25 to 35 percent (percent volume of pores in the resin body or bodies), a surface area of at least about one-half square meter per gram, and more preferably at least about 2 to 10 square meters per gram. The resin can have porosities much higher than those mentioned above, and can also have surface areas higher than those mentioned above, for example, a few hundred square meters per gram, or higher. Pore size of the polymer or resins can also vary over a wide range with a suitable minimum being in the range of about 10 to 100 Angstrom (A) units. The polymer or resin under most conditions of use will be in the form of dry beads or finely divided particles of about 8 to about 200 mesh, and more preferably about 16 to about 60 mesh (U.S. Standard Sieve Series). The sulfonated, macroreticular vinyl nitrogen heterocyclic resins when used as gas phase adsorbents for $SO_2$ and/or $SO_3$ are most effectively used in their sodium or other alkali metal salt form and in the dry state. They may be prepared initially in this form after sulfonation and upon neutralization with sodium hydroxide, for example, or they may be converted to the sodium or other alkali metal or alkaline salt form upon chemical regeneration of the resin such as, for example, sodium hydroxide, potassium hydroxide, ammonia, etc. The resins may also be used in the moist form, especially when used as ion exchange resins. The novel sulfonated, macroreticular vinyl nitrogen heterocyclic resins contain some weak base functionality or weak base groups, which is usually pyridine or pyridine-like groups or functionality. They also contain some strong acid groups or functionality, i.e., due to the presence of sulfonic groups. Thus, the resin may be referred to or considered as, in accordance with common usage or terminology, amphoteric or ampholytic ion exchange resins, since they contain both basic and acidic groups.

The basic groups, i.e., the pyridine or pyridine-like groups, may be used to neutralize or react with a strong mineral acid such as HCl, $H_2SO_4$, etc., and in this manner the resin may act as a weak base resin, or the acid groups, i.e., the sulfonic groups may be used to neutralize or react with based such as NaOH, KOH, etc., and in this manner the resin may act as a strong acid resin.

Throughout the specification and claims and in the examples given below, which will further illustrate the invention but which are not intended to limit it, all parts and percentages are by weight unless otherwise stated. Porosity may be reported as percent porosity or as a decimal figure, e.g., o.x ml/ml, which can be converted to percent porosity by multiplying by 100. Pore structure characteristics can be determined according to well-known methods, e.g., see the methods set forth at pages 155 to 167 of "Oxidation-Reduction Polymers" by H. G. Cassidy and K. A. Kun, published by Interscience Publishers, New York, N.Y., 1965.

EXAMPLE 1

A series of macroreticular, porous sulfonated resins based on macroreticular, porous copolymers of a vinylpyridine monomer crosslinked with varying amounts of divinylbenzene (sometimes abbreviated as DVB) or other crosslinker. These resins, which are usually used in a 20 to 70 mesh cut (U.S. Standard Sieve Series) and generally have porosities in the range of about 0.30 ml/ml to about 0.60 ml/ml (30 to 60 percent) and surface areas in the range of about 1 to about 300 sq. meters per gram. The resins are prepared as follows: In a suitable flask or container equipped with a four paddle stainless steel stirrer, thermometer, reflux condenser, nitrogen inlet, heating mantle, thermowatch pot lifter, and Dean-Stark trap for solvent removal, the following charge is prepared and added, as set forth in more detail herein below:

a. Suspension Polymerization preparation of 4-vinylpyridine resin crosslinked with about 50 percent of divinylbenzene.

Charge:
Aqueous Phase

| | |
|---|---|
| 1920 gm | tap water |
| 780 gm | salt (NaCl) |
| 90 gm | polyethylene polyhydroxy polyamine (30% resin solids) |
| 12 gm | bisulfate salt of poly 2-vinylimidazoline |
| 0.6 gm | Sodium nitrite |
| Monomer Phase | (Organic Phase) |
| 343 gm | 4-vinylpyridine |
| 557 gm | Divinylbenzene (80%)* |
| 900 gm | Diisobutylketone (DIBK) |
| 1.8 gm | Azo-bis-isobutyronitrile |

*80% pure DVB, i.e., about 446 gm of pure DVB, balance of 20%, or about 111 gm, ethylvinylbenzene which copolymerizes with the vinylpyridine and/or the DVB.

Procedure: The aqueous phase, containing the components given above, is prepared and placed in the flask or container. The monomers and solvent and catalyst, i.e., the organic phase is prepared and mixed in a separate container and then added to the aqueous phase in the flask. The agitator is set at about 4 RPM and the cyclic procedure of 1.5 minutes on and 0.5 minutes off is used to form the suspension. After the organic phase is completely suspended the temperature is increased to 65° C. and maintained at 65° C. for 10 hours. The polymerization is quite rapid and a slight exotherm is normally experienced within the first 30 minutes. Air cooling or other cooling may be used to control the exotherm. After the polymerization is complete the brine is drained and the resin washed twice with enough water to form a stirrable slurry. The water washings are discarded, and the flask is filled with enough water to make a fluid mixture. The DIBK is then removed via azeotropic distillation. The distillation is continued until no more DIBK distills. The water is drained and the beads are batch washed four times for 15 minutes each time with a liter of water to remove any contaminants. The beads are filtered and dried at 100°–120° C. The yield is 883 gm dried resin (98.1 percent) or copolymer in the macroreticular form, containing about 50 percent divinylbenzene, about 38 percent 4-vinylpyridine and about 12 percent ethylvinylbenzene. For subsequent sulfonation the resin must be thoroughly dry.

(b) Sulfonation
Quantities

| | |
|---|---|
| 300.00 gms | Dried Copolymer, from (a) above |
| 3000.0 gms | Sulfuric Acid (99%) |
| 3000.0 gms | Water (for quench) |

The dry copolymer is added to a flask with the stirring off. The sulfuric acid is added cautiously via a dropping funnel while maintaining the temperature below 70° C. The rate of addition is adjusted to maintain this temperature limit. After all the sulfuric acid has been added the agitation is started and the temperature gradually increased to 120° C. The slurry is maintained at 120° C. for 6 hours while stirring. The slurry is cooled to 70°–80° C. and the water is added does not gradually at such a rate that the temperature exceed 100° C. As the reaction subsides the rate of addition can be increased. The diluted sulfuric acid is drained from the beads after the temperature has dropped below 35° C. The beads are then batch washed twice with 3,000.0 ml of water to remove excess acid. (Wash 30 minutes each time). The beads are drained and packed out to the backwash tower. The beads are washed until the wash solution is neutral. The resin is drained and a 15 percent sodium hydroxide solution is added (enough to cover the beads). The beads are allowed to soak in the sodium hydroxide solution for 12–16 hours. The sodium hydroxide solution is drained and the beads washed until neutral. Drain and pack out. The beads are dried at 75° C. until all water is removed (a vacuum dryer is preferable). Dried yield is 446.0 gm (93.0 percent yield). The dry product is a sulfonated, macroreticular divinylbenzene crosslinked 4-vinylpyridine resin or copolymer, in the sodium salt form, of about 16 to 70 mesh size. The macroreticular product is a sulfonated copolymer of about 50 parts of divinylbenzene, about 38 parts of 4-vinylpyridine and about 12 parts of ethylvinylbenzene. The product has a porosity of about 0.55 ml/ml/(55 percent), a surface area of about 126 square meters per gram, an initial sulfur dioxide adsorption capacity of about 0.72 mmole/gm. of resin, and an average $SO_2$ adsorption capacity in the range of about 0.3–0.5 mmole/gm. of resin (after numerous cycles of adsorption and thermal elution). Percent utilization of total resin $SO_2$ adsorption capacity is about 92 percent at breakthrough, i.e., at the 50 ppm $SO_2$ level in the effluent gas, the original makeup of which is air and $SO_2$, with the $SO_2$ initially at the 2,000 ppm level. Elemental analysis of the resin shows 7.33 percent sulfur and 0.93 percent Na. This is consistent with a sulfonation of approximately 60 percent of the aromatic, non-pyridine portion, (i.e., the DVB and ethylvinylbenzene).

EXAMPLE 2

Another resin is made following the teachings and procedure of Example 1, but with the following changes: the DVB, ethylvinylbenzene and 4-vinylpyridine components are adjusted to give a macroreticular copolymer of about 40 percent or 40 parts of DVB, about 10 percent of ethylvinylbenzene and about 50 percent of 4-vinylpyridine, and the diisobutylketone phase-extending or solvent level is adjusted to about 40 percent. The product is thereafter sulfonated, as above, but with the addition of some ethylene dichloride to the sulfonation media. The finished products is in bead and dry, sodium salt form and is a sulfonated, macroreticular copolymer of about 40 parts of DVB, 10 parts of ethylvinylbenzene, and 50 parts of 4-vinylpyridine. The product has a porosity of above 0.47 ml/ml, a surface area of about 87 sq. meters per gram, an initial sulfur dioxide adsorption capacity of about 0.66 m.mole/gm of resin, and an average $SO_2$ adsorption capacity in the range of about 0.3–0.5 m.mole/gm of resin after many cycles of adsorption and elution. Elemental analysis of the resin or final product shows about 6.5 percent sulfur and 0.75 percent sodium (Na).

EXAMPLE 3

The procedures and teachings of Example 2, above, are followed but adjusted to give a sulfonated, macroreticular copolymer of about 30 parts of DVB, 7.5 parts of ethylvinylbenzene and 62.5 parts of 4-vinylpyridine. The product, in the dry bead and sodium salt form, has a porosity of about 0.48 ml/ml, a surface area of about 28 sq. meters per gram, and an initial sulfur dioxide adsorption capacity of about 0.71 m.mole/gm of resin, and an average $SO_2$ adsorption capacity in the range of about 0.3–0.5 m.mole/gm. of resin after many cycles of adsorption. The resin has an elemental analysis of 5.46 percent sulfur and about 1.4 percent Na.

EXAMPLE 4

The teachings of Example 2 are followed but adjusted to produce a sulfonated, macroreticular 4-vinylpyridine resin or copolymer containing about 20 percent DVB crosslinker. (Also, the diisobutylketone level is raised from 40 percent to 50 percent). The resin has an elemental sulfur analysis of 3.9 percent and 0.65 percent sodium. The porosity of the resin is about 0.58 ml/ml, the surface area is about 1.9 sq. meter per gram. The resin has an initial sulfur dioxide adsorption capacity of about 0.36 m.mole/gm of resin. The sulfur analysis of the resin is consistent with a degree of sulfonation of a little over 50 percent of the aromatic, non-pyridine portion. ($SO_2$ adsorption capacities in the Examples are determined at 50° C.)

Sulfonated, macroreticular products, following the teachings of the Examples above, may be obtained with similar properties, but using trivinylbenzene as the crosslinker. Also, there may be used a pure divinylbenzene, i.e., the ethylvinylbenzene is optional, and crosslinked copolymers based on the 2- or 4-vinylpyridine and pure DVB have similar properties.

The novel, sulfonated, macroreticular vinyl nitrogen heterocyclic resins or crosslinked copolymers of the present invention have unusual oxidative stability. They are very useful as adsorbents for $SO_2$ and/or $SO_3$. The adsorbed $SO_2$ can be readily eluted (resin regeneration) by thermal means, e.g., hot dry air, nitrogen, etc., usually at a higher temperature than the adsorption. $SO_2$ can, for example, be very effectively adsorbed at 50° C. and eluted at 100° to 120° C by the resins. The resins of the invention can also be chemically regenerated, to remove sulfate, with bases such as NaOH, KOH, etc. As heretofore noted, the macroreticular products of the present invention are also useful as ion-exchange resins.

I claim:

1. A sulfonated, macroreticular vinyl nitrogen heterocyclic resin comprising a sulfonated macroreticular crosslinked copolymer of (a) about 30 to about 50 parts by weight of divinylbenzene, and (b) about 70 to about 50 parts by weight of a vinylpyridine monomer, said resin having a porosity of at least about 35 percent, a surface area of at least about 10 square meters per gram, the resin being in the dry state, and the resin being in the alkali metal or alkaline earth metal form, said resin also being especially useful as an adsorbent for acid gases.

2. A resin according to claim 1, wherein the vinylpyridine monomer is 4-vinylpyridine.

3. A resin according to claim 1, wherein the metal is sodium.

* * * * *

UNITED STATES PATENT OFFICE
CERTIFICATE OF CORRECTION

Patent No. 3,816,355　　　　　Dated　June 11, 1974

Inventor(s) David H. Clemens

It is certified that error appears in the above-identified patent and that said Letters Patent are hereby corrected as shown below:

Col. 2, line 10, "styrenese" should read --styrenes-- .

Col. 3, line 7, "clase" should read --class-- .

Col. 3, line 8, "al" should read --all-- .

Col. 3, line 18, "Non-Electrolyes" should read --Non-Electrolytes-- .

Col. 3, line 23, "or many other liquids" should read --of many other liquids-- .

Col. 5, line 9, "based" should read --bases-- .

First page, line 7 of Abstract, "fossile" should read -- fossil --.

Column 1, line 30, "oolo/oo3/NCD" should read -- $CH_2=C<$ --.

Signed and sealed this 12th day of November 1974.

(SEAL)
Attest:

McCOY M. GIBSON JR.　　　　　　　C. MARSHALL DANN
Attesting Officer　　　　　　　　Commissioner of Patents